(12) United States Patent
Nishioka

(10) Patent No.: US 9,906,762 B2
(45) Date of Patent: Feb. 27, 2018

(54) COMMUNICATION APPARATUS, METHOD OF CONTROLLING COMMUNICATION APPARATUS, NON-TRANSITORY COMPUTER-READABLE STORAGE MEDIUM

(71) Applicant: CANON KABUSHIKI KAISHA, Tokyo (JP)

(72) Inventor: Yoshio Nishioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/323,865

(22) PCT Filed: Aug. 28, 2015

(86) PCT No.: PCT/JP2015/004376
§ 371 (c)(1),
(2) Date: Jan. 4, 2017

(87) PCT Pub. No.: WO2016/038842
PCT Pub. Date: Mar. 17, 2016

(65) Prior Publication Data
US 2017/0142382 A1 May 18, 2017

(30) Foreign Application Priority Data
Sep. 10, 2014 (JP) .................. 2014-184542

(51) Int. Cl.
*H04N 5/66* (2006.01)
*H04N 9/31* (2006.01)
(Continued)

(52) U.S. Cl.
CPC ......... *H04N 9/3185* (2013.01); *G06F 3/0488* (2013.01); *G06F 3/04847* (2013.01);
(Continued)

(58) Field of Classification Search
CPC .. H04N 9/3185; H04N 9/3147; H04N 9/3182; G06F 3/04847; G06F 3/0488; G06F 2203/04806; G06F 2203/04808
(Continued)

(56) References Cited

U.S. PATENT DOCUMENTS

| 2002/0159035 A1 | 10/2002 | Koyama et al. ............... 353/31 |
| 2006/0215062 A1 | 9/2006 | Hirayama .................... 348/588 |

(Continued)

FOREIGN PATENT DOCUMENTS

| JP | 2006-254275 A | 9/2006 |
| JP | 2014-021985 A | 2/2014 |

*Primary Examiner* — Michael Lee
(74) *Attorney, Agent, or Firm* — Fitzpatrick, Cella, Harper & Scinto

(57) ABSTRACT

Configuration information indicating a positional relationship for projected images of a plurality of projectors in a multi-projection realized by the plurality of projectors is acquired. An instruction on the display screen, which displays an image according to the positional relationship is accepted. Based on the configuration information and the position in the display screen of the accepted instruction, a projector for which a setting is to be changed is specified from the plurality of projectors. A signal to change the setting of the specified projector is transmitted.

19 Claims, 12 Drawing Sheets

(51) Int. Cl.
*G06F 3/0488* (2013.01)
*G06F 3/0484* (2013.01)

(52) U.S. Cl.
CPC ......... *H04N 9/3147* (2013.01); *H04N 9/3182* (2013.01); *G06F 2203/04806* (2013.01); *G06F 2203/04808* (2013.01)

(58) Field of Classification Search
USPC .......................................................... 348/383
See application file for complete search history.

(56) References Cited

U.S. PATENT DOCUMENTS

| | | | |
|---|---|---|---|
| 2007/0291184 A1 | 12/2007 | Harville et al. | 348/745 |
| 2010/0182234 A1 | 7/2010 | Takahashi et al. | 345/157 |
| 2011/0055729 A1* | 3/2011 | Mason | G06F 3/0425 |
| | | | 715/753 |
| 2011/0128294 A1 | 6/2011 | Manabe et al. | 345/581 |
| 2011/0210987 A1 | 9/2011 | Furui | 345/682 |
| 2012/0319997 A1* | 12/2012 | Majumder | H04N 9/3147 |
| | | | 345/175 |
| 2013/0293443 A1 | 11/2013 | Seo et al. | 345/1.2 |
| 2014/0022159 A1 | 1/2014 | Leigh et al. | 345/156 |
| 2014/0146080 A1 | 5/2014 | Ivashin et al. | 345/629 |
| 2014/0245148 A1* | 8/2014 | Silva | H04N 5/44591 |
| | | | 715/719 |

\* cited by examiner

[Fig. 1]
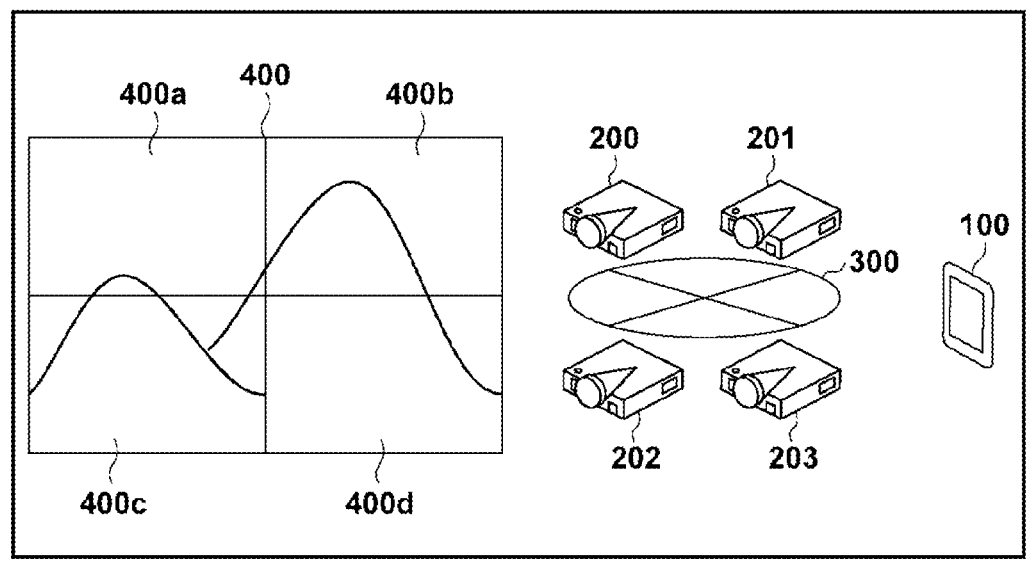
[Fig. 2]
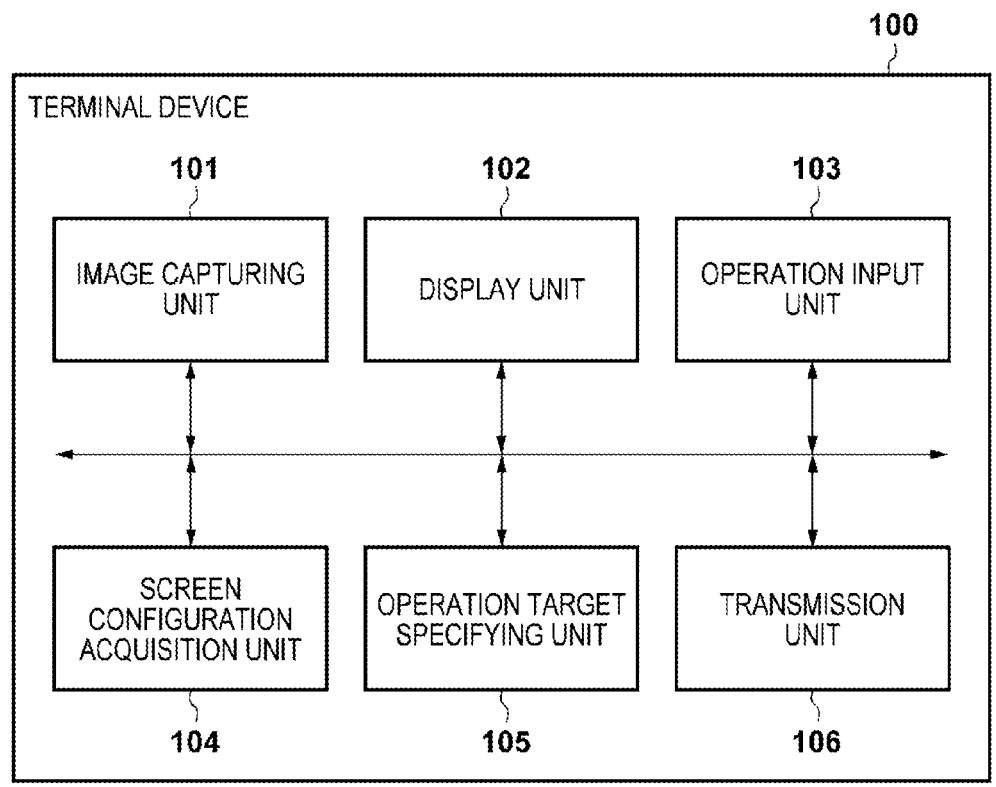

[Fig. 3]
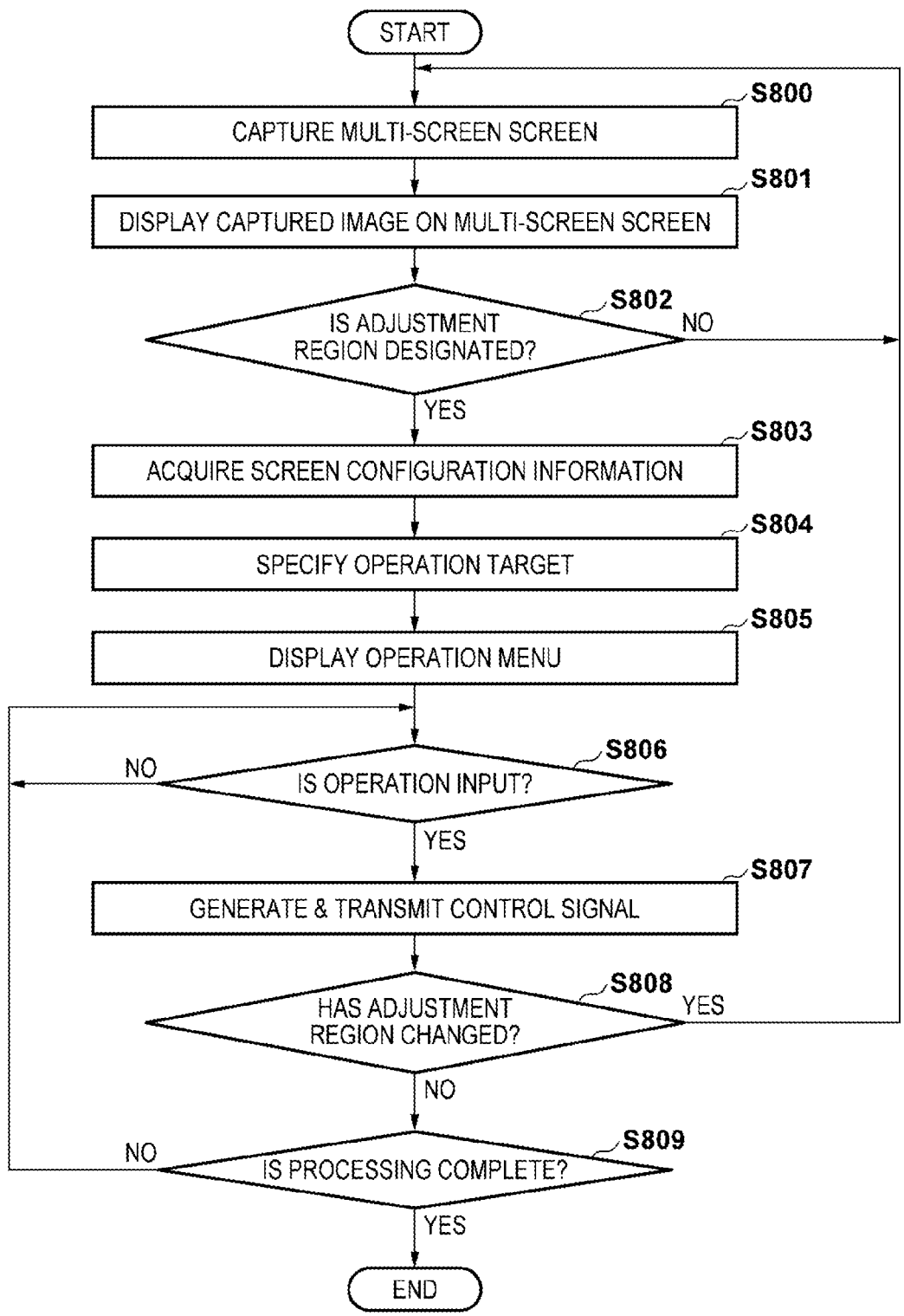

[Fig. 4A]
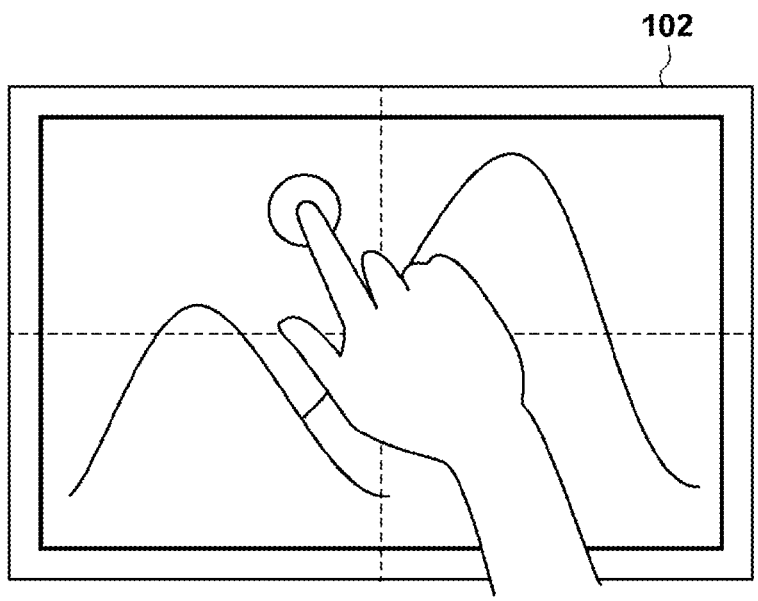
[Fig. 4B]
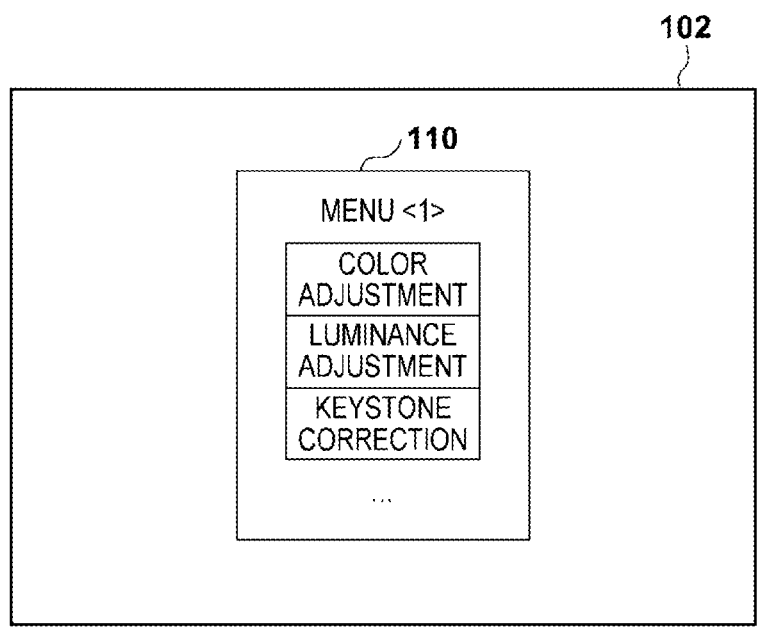

[Fig. 5]
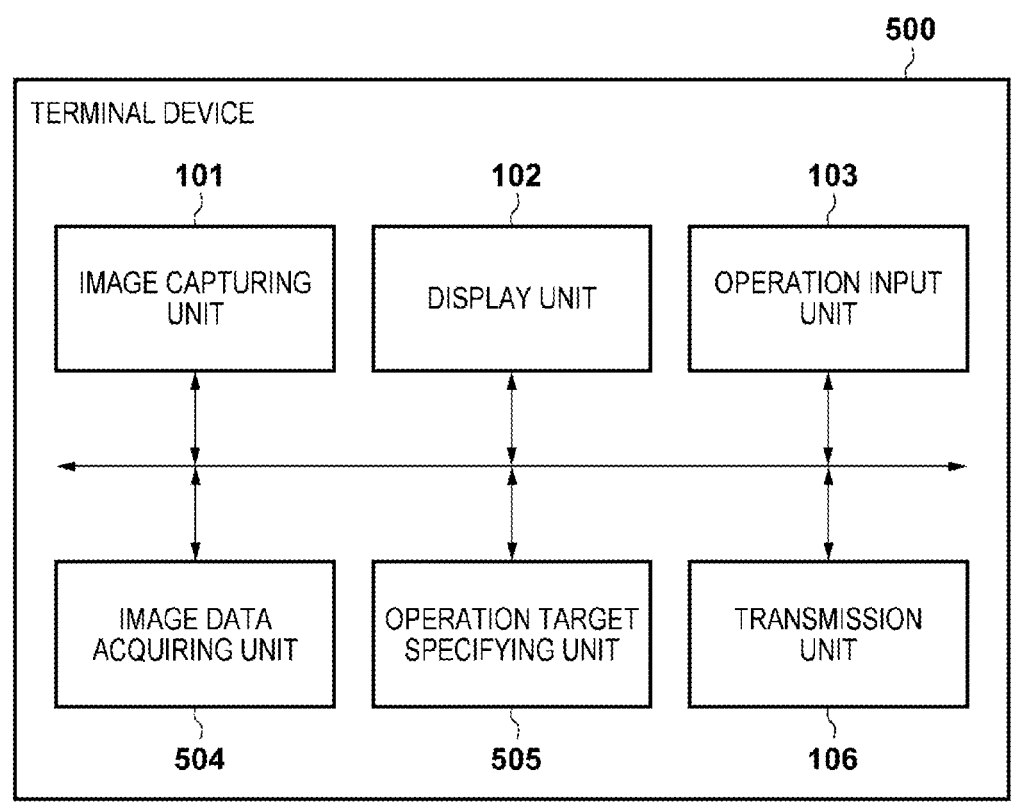

[Fig. 6]
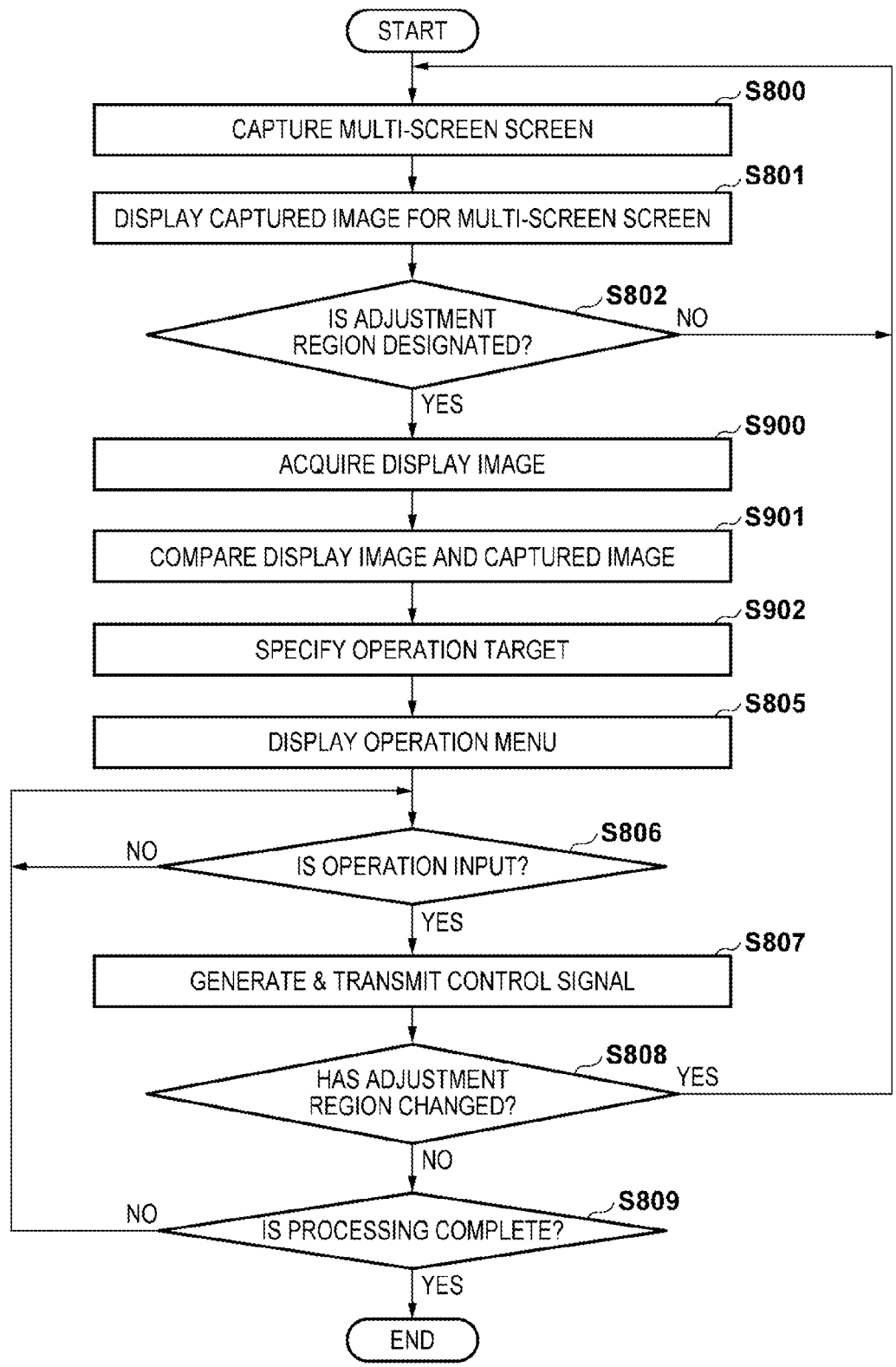

[Fig. 7A]
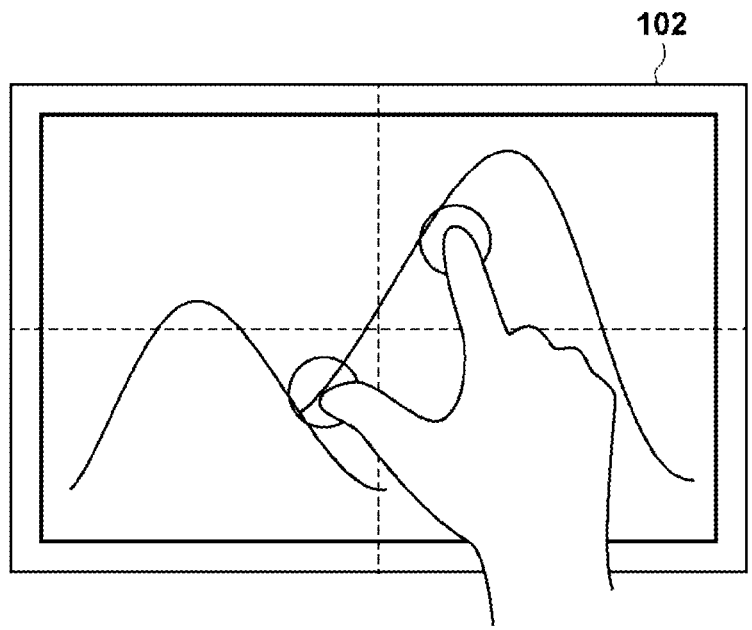
[Fig. 7B]
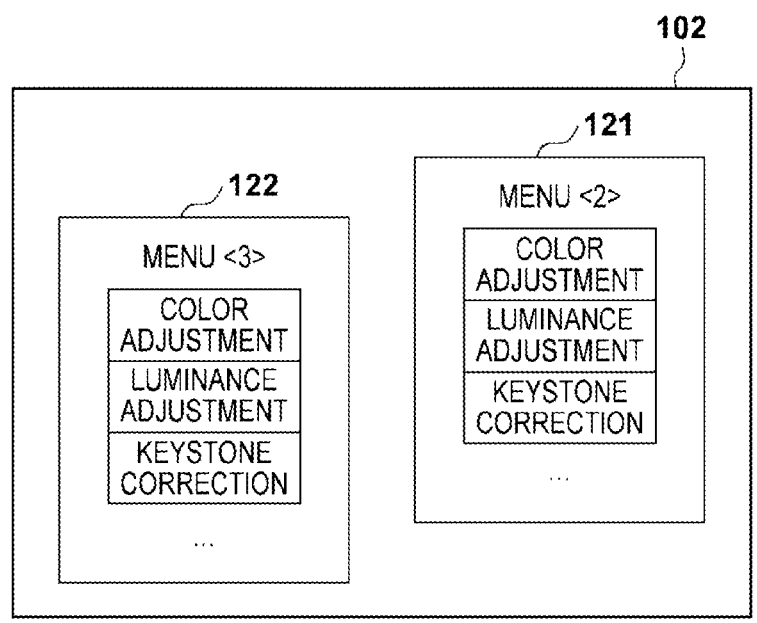

[Fig. 8A]
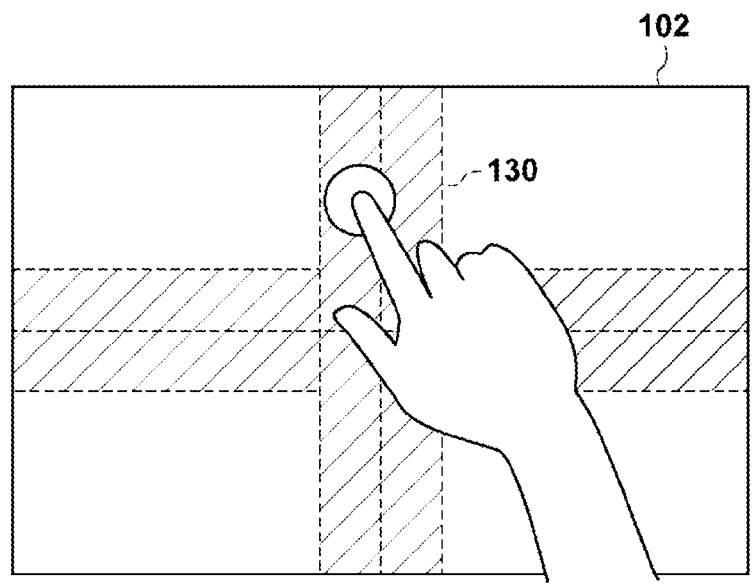
[Fig. 8B]
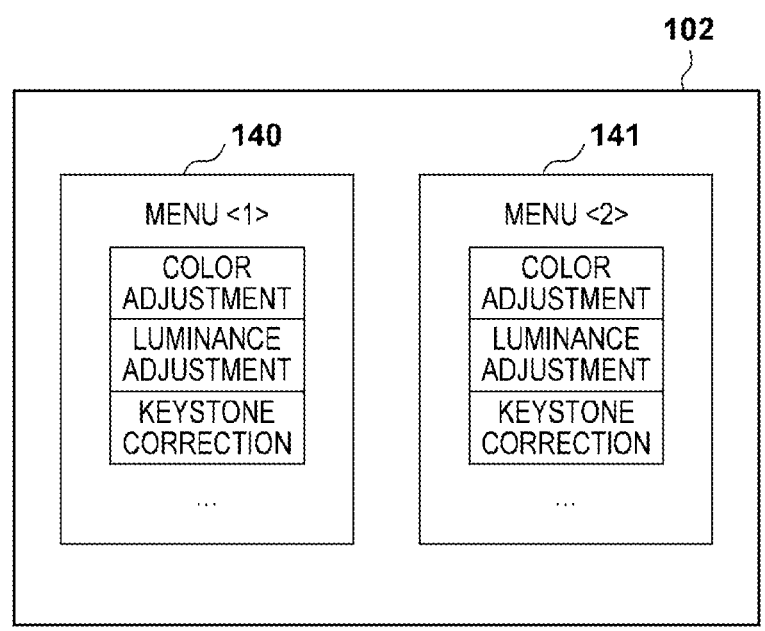

[Fig. 9]
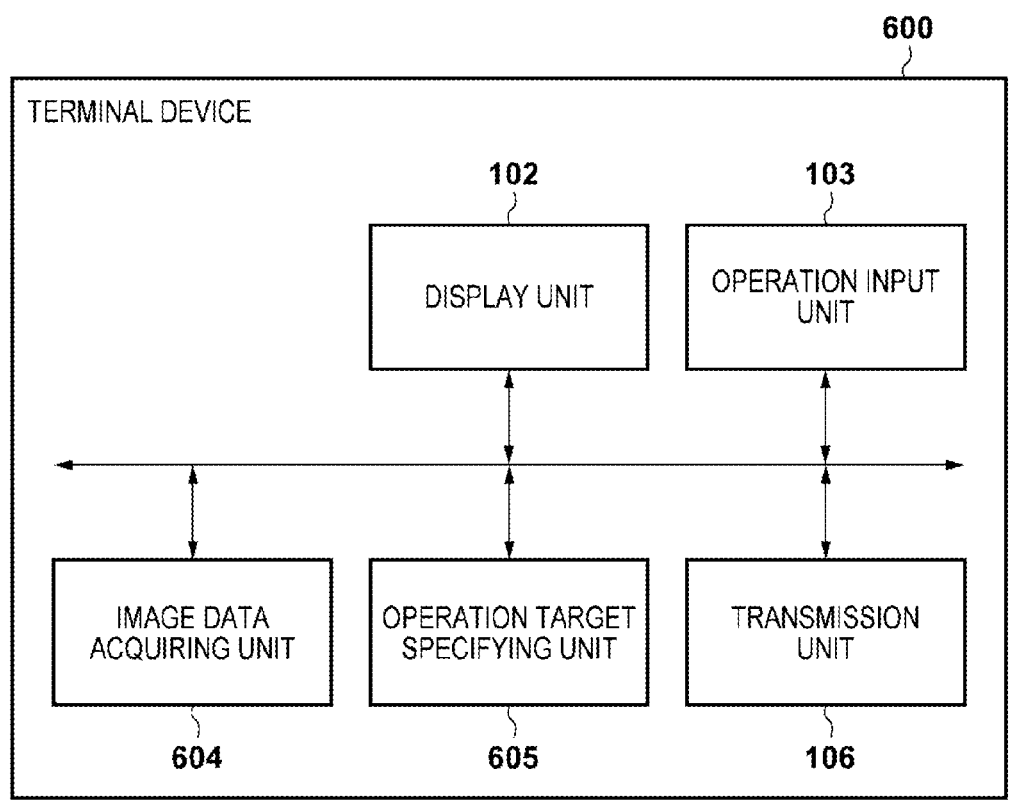

[Fig. 10]
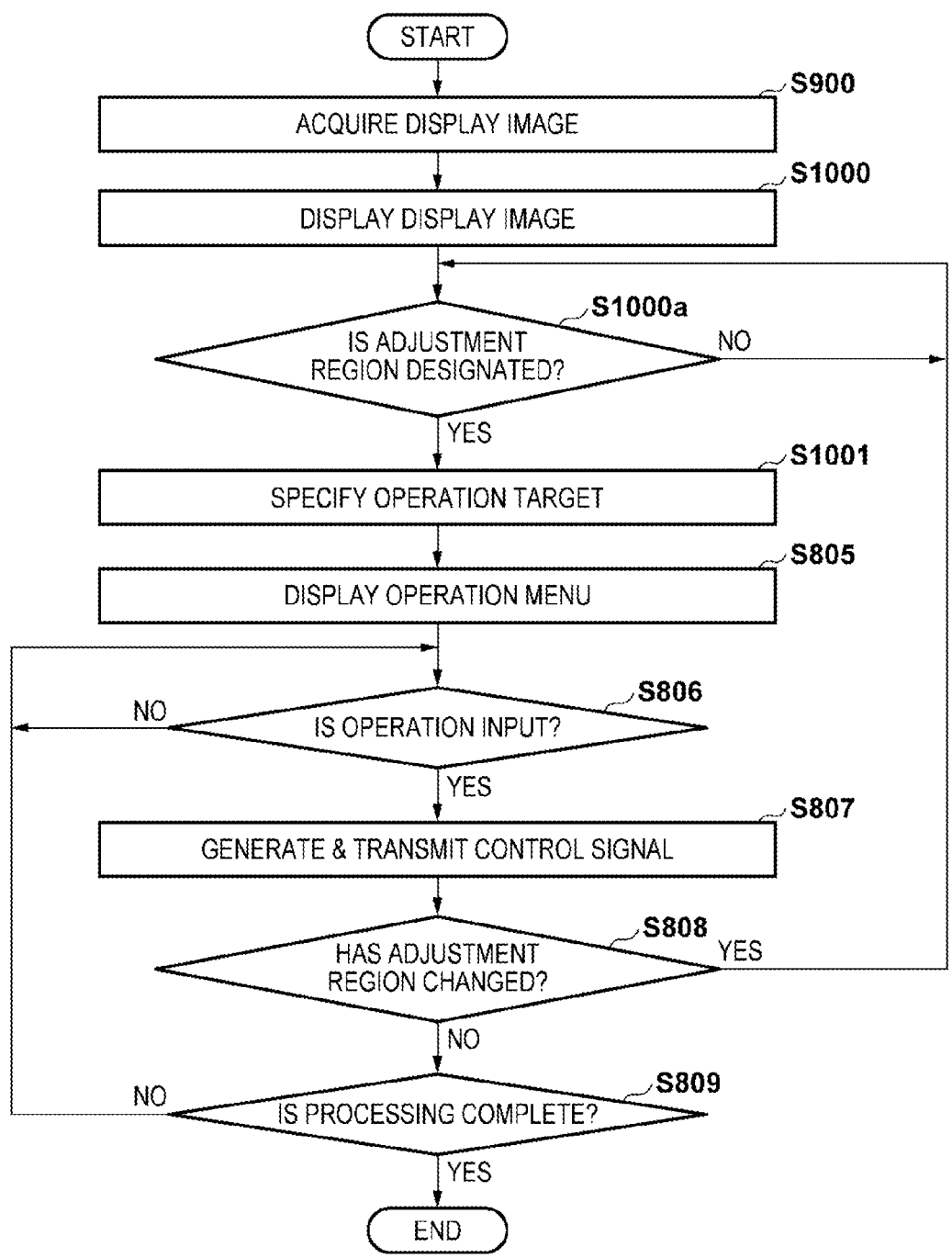

[Fig. 11]
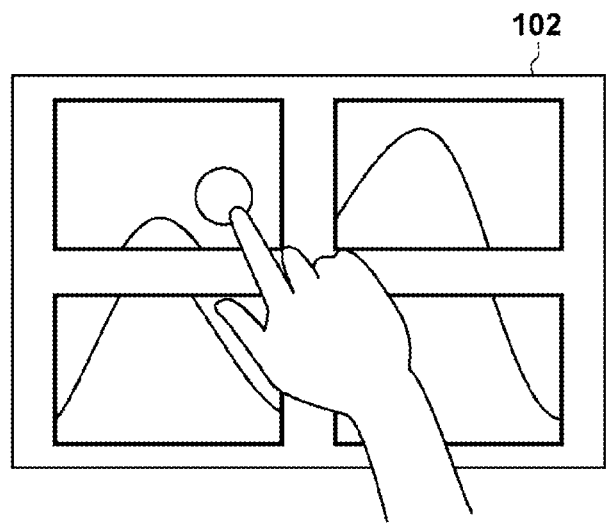
[Fig. 12]
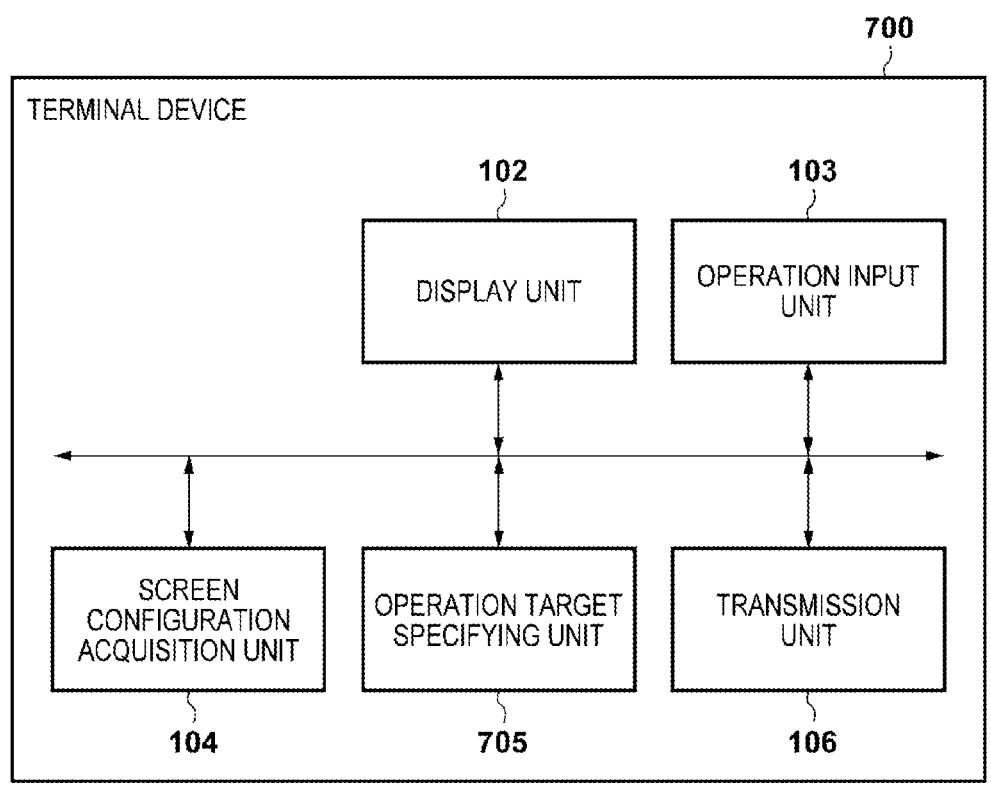

[Fig. 13]
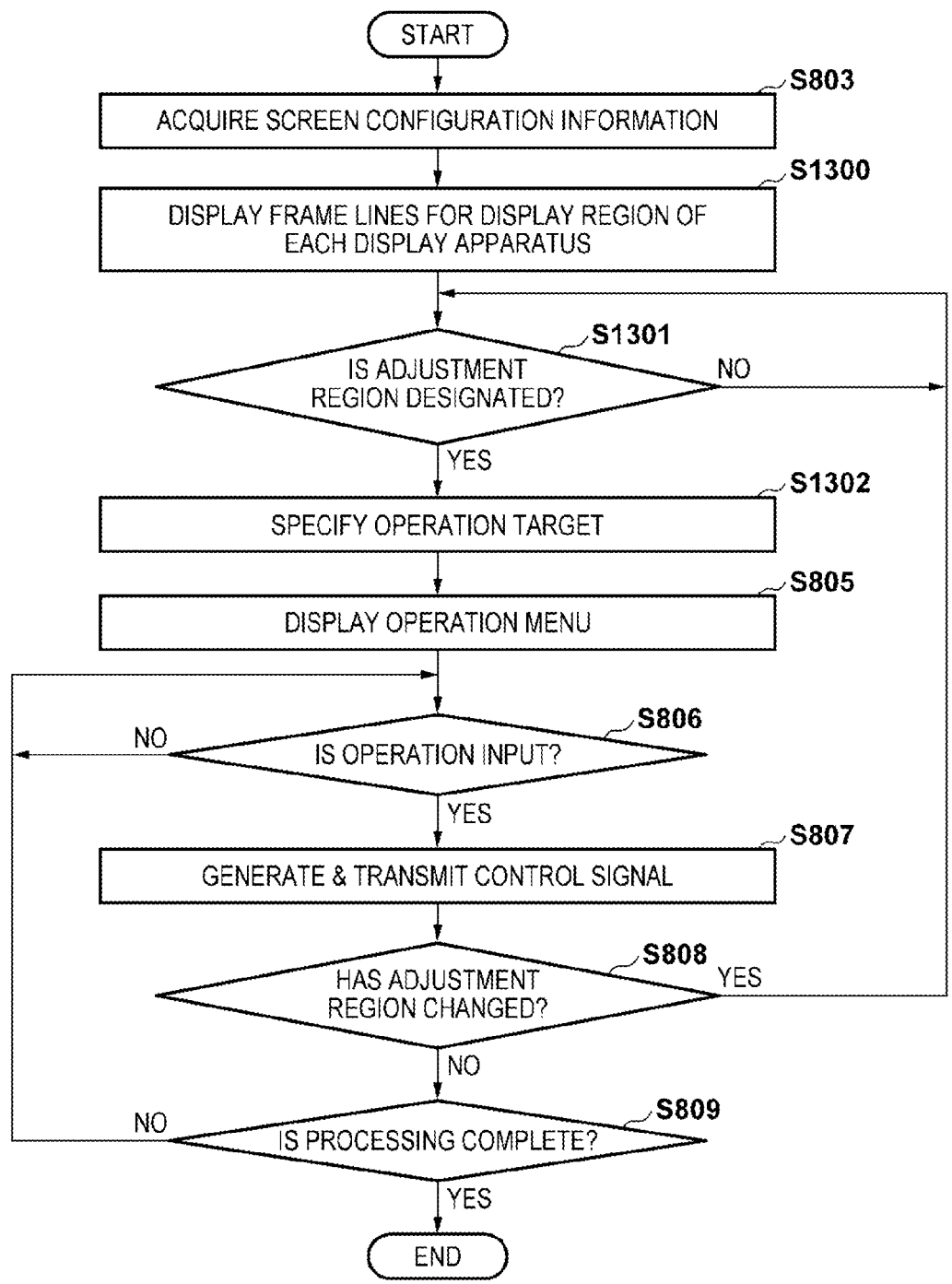

[Fig. 14]
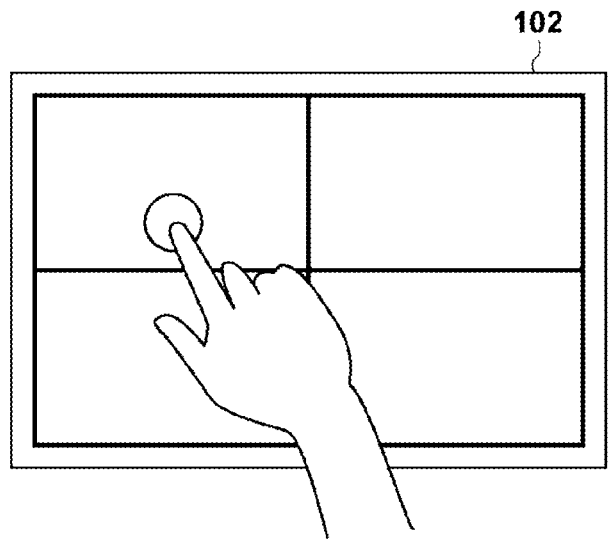
[Fig. 15]
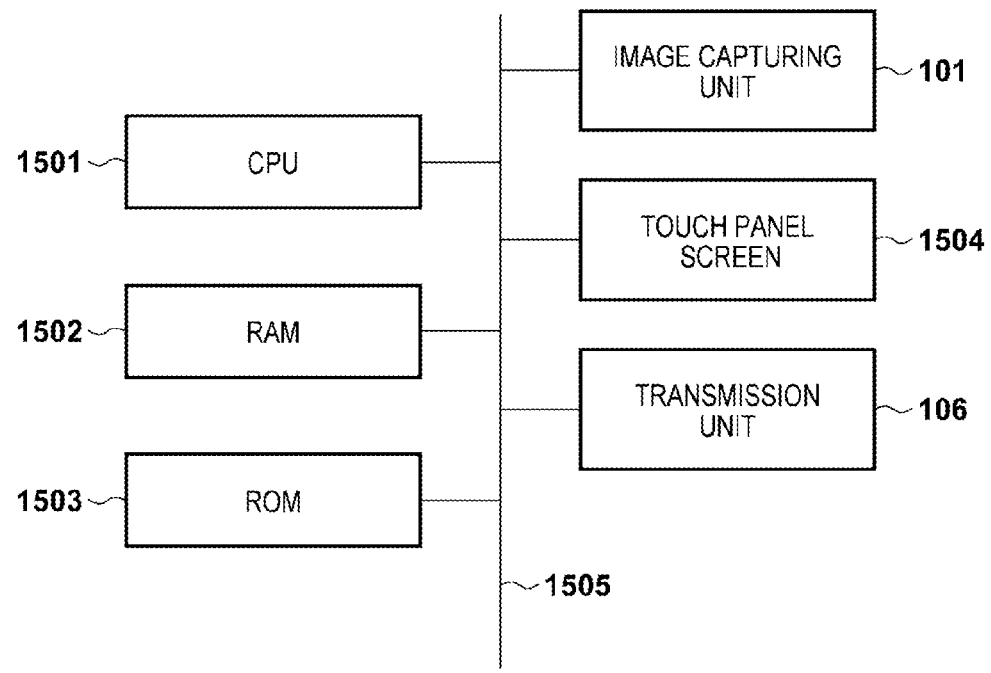

COMMUNICATION APPARATUS, METHOD OF CONTROLLING COMMUNICATION APPARATUS, NON-TRANSITORY COMPUTER-READABLE STORAGE MEDIUM

TECHNICAL FIELD

The present invention relates to a technique of adjusting a plurality of projectors that comprise a multi-screen display.

BACKGROUND ART

A display system, comprised by lining up a plurality of projectors into a large-type multi-screen display used in a place where a large number of people view the display such as an exhibition hall or a cinema. With such a multi-screen display, because there is an unnatural feel if the image quality for the projected image differs for each projector, it is necessary to perform image quality adjustment individually, and adjust so that the overall multi-screen display has a single image quality. With respect to neighboring boundaries for the projected images of each projector, it is also possible to realize a multi-screen display that has seamlessness and no joint lines by arranging an overlapping region between projectors and then adjusting each luminance.

In this way, for a display system comprising a multi-screen display, a user needs to perform a setting operation, such as an image quality adjustment or a position adjustment, for many projectors. When using a remote controller provided for each projector (hereinafter, remote controller), the user needs to perform settings while changing the remote controller each time, which is cumbersome.

Japanese Patent Laid-Open No. 2006-254275 discloses a technique of displaying an ID for identifying a display apparatus on a display apparatus configuring a multi-display, and selecting the ID with a remote controller to thereby display a menu for a specific display apparatus and enable setting thereof.

Japanese Patent Laid-Open No. 2014-21985 discloses a technique of, to control a plurality of display apparatuses through one input apparatus, determining which display apparatus a user is fixated on, and transmitting a control signal corresponding to a user instruction to that display apparatus.

However, for the technique disclosed in Japanese Patent Laid-Open No. 2006-254275, operation is cumbersome because a user needs to first specify a region for which adjusting is desired and the display device that displays the region, and subsequently input the ID for the specified display device by the remote controller. When there are a large number of projectors that comprise a multi-screen display, or when adjusting at a high level so that there is no joint line for neighboring boundaries of the projected image for each projector, it is not easy for a user to specify which projector is projecting onto a region to be adjusted. In addition, because displaying an ID or a menu impedes a view, such displaying is not suitable for a multi-screen display that many people view.

For the technique disclosed by Japanese Patent Laid-Open No. 2014-21985, because a control target is determined in accordance with a user's line of sight, accurately determining a control target is difficult for a multi-screen display in which display images for display apparatuses are very near to each other. In a place in which many people are viewing, because many lines-of-sight exist, it is not possible to uniquely determine a control target.

SUMMARY OF INVENTION

The present invention was conceived in view of these kinds of problems, and for a multi-screen display by a plurality of projectors, provides a technique for conveniently performing a user operation on a desired projector.

According to a first aspect of the present invention, there is provided a communication apparatus having a display screen, the apparatus comprising:

acquisition means configured to acquire configuration information indicating a positional relationship for projected images of a plurality of projectors in a multi-projection realized by the plurality of projectors;

acceptance means configured to accept an instruction on the display screen, which displays an image according to the positional relationship;

specifying means configured to specify a projector for which a setting is to be changed, from the plurality of projectors, based on a position in the display screen at which the instruction was accepted by the acceptance means, and based on the configuration information acquired by the acquisition means; and transmission means configured to transmit a signal for changing the setting of the projector specified by the specifying means.

According to a second aspect of the present invention, there is provided a method of controlling a communication apparatus that includes a display screen, the method comprising:

acquiring configuration information indicating a positional relationship for projected images of a plurality of projectors in a multi-projection realized by the plurality of projectors;

accepting an instruction on the display screen, which displays an image according to the positional relationship;

specifying a projector for which a setting is to be changed, from the plurality of projectors, based on a position in the display screen at which the instruction was accepted in the accepting, and the configuration information acquired in the acquiring; and transmitting a signal for changing the setting of the projector specified in the specifying.

According to a third aspect of the present invention, there is provided a non-transitory computer-readable storage medium storing a computer program for causing a computer to function as:

acquisition means configured to acquire configuration information indicating a positional relationship for projected images of a plurality of projectors in a multi-projection realized by the plurality of projectors;

acceptance means configured to accept an instruction on a display screen, which displays an image according to the positional relationship;

specifying means configured to specify a projector for which a setting is to be changed, from the plurality of projectors, based on a position in the display screen at which the instruction was accepted by the acceptance means, and based on the configuration information acquired by the acquisition means; and transmission means configured to transmit a signal for changing the setting of the projector specified by the specifying means.

Further features of the present invention will become apparent from the following description of exemplary embodiments (with reference to the attached drawings).

BRIEF DESCRIPTION OF DRAWINGS

FIG. 1 is a view for illustrating an example configuration of a system.

FIG. 2 is a block diagram for illustrating an example of a functional configuration of a terminal device 100.

FIG. 3 is a flowchart for processing that the terminal device 100 performs.

FIG. 4A is a view for explaining step S805.

FIG. 4B is a view for explaining step S805.

FIG. 5 is a block diagram for illustrating an example of a functional configuration of a terminal device 500.

FIG. 6 is a flowchart for processing that the terminal device 500 performs.

FIG. 7A is a view showing an instruction operation for a projected image and a menu screen displayed upon the instruction operation.

FIG. 7B is a view showing an instruction operation for a projected image and a menu screen displayed upon the instruction operation.

FIG. 8A is a view showing an instruction operation for a projected image and a menu screen displayed upon the instruction operation.

FIG. 8B is a view showing an instruction operation for a projected image and a menu screen displayed upon the instruction operation.

FIG. 9 is a block diagram for illustrating an example of a functional configuration of a terminal device 600.

FIG. 10 is a flowchart for processing that the terminal device 600 performs.

FIG. 11 is a view showing a display example for an original image.

FIG. 12 is a block diagram for illustrating an example of a functional configuration of a terminal device 700.

FIG. 13 is a flowchart for processing that the terminal device 700 performs.

FIG. 14 is a view showing a display example of a frame.

FIG. 15 is a block diagram for showing an example of a hardware configuration of a terminal device.

DESCRIPTION OF EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

First Embodiment

According to this embodiment, explanation will be given for an example of a communication apparatus that has a display screen. In other words, explanation is given of an example of a communication apparatus that acquires configuration information indicating a positional relationship for projected images of a plurality of projectors in a multi-projection realized by the plurality of projectors, accepts an instruction for a display screen that displays an image according to the positional relationship, and, based on a position in the display screen of the accepted instruction and the acquired configuration information, specifies a projector, out of the plurality of projectors, of which a setting is to be changed, and transmits a signal for changing the setting of the specified projector.

Firstly, FIG. 1 is used to give an explanation regarding the system according to the present embodiment. As shown in FIG. 1, the system according to the present embodiment has projection devices 200-203 and a terminal device 100; the projection devices 200-203 and the terminal device 100 are each connected to a wired or wireless LAN 300. Of course, a network other than a LAN may be used.

The projection devices 200-203 are each a device that functions as a projector that projects an image onto a flat surface (for example, a projection surface such as a screen), and for example, by the projection device 200 projecting an image 400a, the projection device 201 projecting an image 400b so that the image 400b is adjacent to the image 400a on the right thereof, the projection device 202 projecting an image 400c so that the image 400c is adjacent to the image 400a and below the image 400a, and the projection device 203 projecting an image 400d so that the image 400d is adjacent to the image 400c on the right thereof, it is possible to form an image 400 (a multi-screen display) on the same flat surface. Hereinafter, explanation is given for a case in which each of the projection devices 200-203 respectively project the images 400a-400d on a flat surface in this way to form the one image 400 on the flat surface. Note that according to this embodiment, explanation is given focusing on an example of a case in which an image is projected onto a flat surface, but the content of the present embodiment is applicable even in a case of projecting onto a curved surface. In addition, the multi-screen display is not limited to the form shown in FIG. 1, and may be of a form in which a plurality of projection devices are used, and image projection onto a large screen is performed by causing portions of the projection areas of the projection devices to overlap.

The terminal device 100 is a device having a touch panel screen and an image capturing unit, such as a smart phone or a tablet terminal device; in the present embodiment, a user uses the terminal device 100 to select a setting change target from among the projection devices 200-203, and is able to perform a setting change for the selected projection device. The block diagram of FIG. 2 is used to given an explanation regarding an example of a functional configuration of the terminal device 100. A setting change includes adjusting, in accordance with settings for other projection devices, a setting for the projection device that is the setting change target.

An image capturing unit 101 is a camera integrated in the terminal device 100 (but may be a camera externally attached to the terminal device 100). Note that the camera may be a camera that captures a still image, or may be a video camera that captures a moving image. If the image capturing unit 101 is a video camera, an image (a captured image) is sequentially sent to a display unit 102 for each captured frame. Thereby, the display unit 102 displays a moving image corresponding to an image capture direction of the image capturing unit 101. Note that the image capturing unit 101 does not necessarily need to capture so that all of the multi-screen display falls within what is captured.

The display unit 102 is a liquid crystal screen, and is capable of displaying a moving image captured by the image capturing unit 101, a menu screen that will be explained later, or the like. An operation input unit 103 is integrated with the display unit 102 to form a touch panel screen; content of operation by a user on the display unit 102 is detected by detecting a position on the display unit 102 that the user touches.

A screen configuration acquisition unit 104 acquires screen configuration information (configuration information) that includes information that defines the images 400a-400d in the image 400 as well as information that defines the image 400. The configuration information is information for associating a position (region) on the display screen of the display unit 102 and identification information for a projection device (i.e., information for associating a region in a captured image and a projection device), and various forms of information can be considered. In the present embodiment, screen configuration information includes the following information.

A vertical size H and a horizontal size W for the image 400.

A region of the image 400a in the image 400 (region a) ($0 \leq x < W1$; $0 \leq y < H1$)

A region of the image 400b in the image 400 (region b) ($W1 \leq x \leq W2$; $0 \leq y < H1$)

A region of the image 400c in the image 400 (region c) ($0 \leq x < W1$; $H1 \leq y \leq H2$)

A region of the image 400d in the image 400 (region d) ($W1 \leq x \leq W2$; $H1 \leq y \leq H2$)

Note that x and y represent respectively an x-coordinate and a y-coordinate in the image 400, with the position of an upper left corner of the image 400 set as the origin point; W1 represents the horizontal size of the image 400a and the image 400c; W2 represents the horizontal size of the image 400b and the image 400d; H1 represents the vertical size of the image 400a and the image 400b; and H2 represents the vertical size of the image 400c and the image 400d.

A method of obtaining this kind of screen configuration information is not limited to a specific approach, and any approach may be employed. For example, something that a user has generated and registered in a memory (not shown) of the terminal device 100 in advance may be acquired; in recent years a technique of using a camera to automatically construct a screen configuration for a multi-screen display has been disclosed—information equivalent to that calculated at a time of the construction may also be acquired from the projection device or an external calculator.

The screen configuration information also includes information indicating that the projection devices that project the images 400a-400d are respectively the projection devices 200-203. For example, by the screen configuration information the region a and the identifier for the projection device 200 are associated, the region b and the identifier for the projection device 201 are associated, the region c and the identifier for the projection device 202 are associated, and the region d and the identifier for the projection device 203 are associated.

Here, in a state in which the image 400 is formed on a flat surface by the projection devices 200-203 respectively projecting the images 400a-400d on the flat surface, when the user holds the terminal device 100 in their hand with the image capturing unit 101 facing the image 400, the image capturing unit 101 captures the image 400, captured images (an image for each frame) for the image 400 are sent to the display unit 102, and the captured images for the image 400 are displayed on the display screen of the display unit 102. The user is able to view a captured images displayed on the display unit 102, and subsequently touch a position in one image out of the images 400a-400d that comprise the image 400 that is included in the captured image. Here, when the user touches the display screen of the display unit 102, it is necessary to determine which of the images 400a-400d displayed on the display unit 102 that the touched position corresponds to.

Accordingly, an operation target specifying unit 105 first detects a region (a multi-screen display region) of the image 400 from the captured image displayed on the display unit 102. For an approach of detecting the multi-screen display region from the captured image, there are various approaches, and there is no limitation to a specific approach. For example, configuration may be performed such that the image 400, at the four corners of which feature points such as a marker are arranged, is projected, and the operation target specifying unit 105 then detects these feature points from the captured image, and detects a region whose four corners are at these detected feature points as the multi-screen display region. The operation target specifying unit 105 obtains a ratio r between the vertical/horizontal size of the detected multi-screen display region and the vertical/horizontal size of the image 400 that is indicated by the screen configuration information acquired by the screen configuration acquisition unit 104 (the vertical/horizontal size of the multi-screen display region/the vertical/horizontal size of the image 400 that is indicated by the screen configuration information acquired by the screen configuration acquisition unit 104). Here, in order to simplify the explanation, explanation is given of a configuration in which the ratio between the vertical size and the horizontal size is the same r.

When the user makes an instruction on the display screen of the display unit 102 such as by touching the display screen, the position (X, Y) at which the instruction was made is detected by the operation input unit 103 (with the position of the upper-left corner of the display screen of the display unit 102 as the origin point). Here, with the assumption that the pixel position for the upper-left corner of the multi-screen display region in the display unit 102 is (xo, yo), the operation target specifying unit 105 refers to the screen configuration information, and if $0 \leq X - xo < r \times W1$ and $0 \leq Y - yo < r \times H1$, determines that the position for which the instruction was made (X, Y) corresponds to a position in the region corresponding to the region a in the display screen of the display unit 102, and thereby determines that an instruction has been made with respect to the image 400a. In such a case, the operation target specifying unit 105 uses the screen configuration information to specify that the projection device 200 corresponding to the identifier associated with the region a is the projection device that projected the image 400a.

The operation target specifying unit 105 refers to the screen configuration information, and if $r \times W1 \leq X - xo \leq r \times W2$ and $0 \leq Y - yo < r \times H1$, determines that the position for which the instruction was made (X, Y) is a position in the region corresponding to the region b in the display screen of the display unit 102, and thereby determines that the instruction was made with respect to the image 400b. In such a case, the operation target specifying unit 105 uses the screen configuration information to specify that the projection device 201 corresponding to the identifier associated with the region b is the projection device that projected the image 400b.

The operation target specifying unit 105 also refers to the screen configuration information, and if $0 \leq X - xo < r \times W1$ and $r \times H1 \leq Y - yo \leq r \times H2$, determines that the position for which the instruction was made (X, Y) is a position in the region corresponding to the region c in the display screen of the display unit 102, and thereby determines that the instruction was made with respect to the image 400c. In such a case, the operation target specifying unit 105 uses the screen configuration information to specify that the projection device 202 corresponding to the identifier associated with the region c is the projection device that projected the image 400c.

The operation target specifying unit 105 also refers to the screen configuration information, and if $r \times W1 \leq X - xo \leq r \times W2$ and rxH1≤Y−yo≤rxH2, determines that the position for which the instruction was made (X, Y) is a position in the region corresponding to the region d in the display screen of the display unit 102, and thereby determines that the instruction was made with respect to the image 400d. In such a case, the operation target specifying unit 105 uses the screen configuration information to specify that the projection device 203 corresponding to the identifier associated with the region d is the projection device that projected the image 400d.

In this way the operation target specifying unit 105 is able to specify an image corresponding to a position for which a user made an instruction on the display screen of the display unit 102 from among the images 400a-400d displayed on the display unit 102, and specify, from among the projection devices 200-203, the projection device that projected the specified image.

A transmission unit 106 transmits, via the LAN 300, information indicating setting change content to the projection device specified by the operation target specifying unit 105.

Next, explanation is given for processing the terminal device 100 performs by using FIG. 3 which shows a flowchart for the processing. Note that below explanation is given of operation of the terminal device 100 when, in a state in which the image 400 is formed on a flat surface by the projection devices 200-203 respectively projecting the images 400a-400d on the flat surface, the user holds the terminal device 100 in their hand with the image capturing unit 101 facing the image 400.

<Step S800>

The image capturing unit 101 captures the image 400 projected on the flat surface, and sequentially sends captured images for the image 400 (an image for each frame) to the display unit 102.

<Step S801>

The captured image for the image 400 is displayed on the display screen of the display unit 102.

<Step S802>

The operation input unit 103 determines whether an instruction operation (for example, a touch operation) to the display unit 102 by a user has been performed. In detail, the operation target specifying unit 105 performs as described above determination of whether an operation instruction has been performed at any position in the detected multi-screen display region. As a result of the determination, if an operation instruction has been performed to any position in the multi-screen display region, processing proceeds to step S803, and if has not been performed, the processing proceeds to step S800.

<Step S803>

The screen configuration acquisition unit 104 acquires the above-described screen configuration information.

<Step S804>

Through the above-described processing, the operation target specifying unit 105 is able to specify an image corresponding to a position for which a user made an instruction on the display screen of the display unit 102 from among the images 400a-400d displayed on the display unit 102, and specify, from among the projection devices 200-203, the projection device that projected the specified image. In other words, the operation target specifying unit 105 specifies the projection device that is the setting change target in accordance with the screen configuration information and the position on the display screen for the user operation corresponding to the display screen displayed by the captured image corresponding to the multi-screen display.

<Step S805>

The operation target specifying unit 105 displays, on the display unit 102, a menu screen enumerating setting items corresponding to the projection device specified in step S804. For example, as shown in FIG. 4A, if the user performs a touch operation on the display screen of the display unit 102 and the operation target specifying unit 105 specifies a projection device corresponding to a position at which the touch operation was performed, as shown in FIG. 4B, the operation target specifying unit 105 displays on the display screen of the display unit 102 a menu screen enumerating setting items corresponding to the specified projection device.

The user operates a menu screen such as this by making an operation to the display unit 102, and sets or changes a value in the various setting items. Because an operation input methods to perform various settings via the menu screen displayed on the touch panel screen or processing that the terminal device 100 performs at that time are well-known, explanation thereof is omitted. In this way, in accordance with a user operation to the menu screen, it is possible to change a setting for the specific projection device. In particular, it is possible to adjust the luminance, color, or projection shape of the plurality of projection devices that perform a multi-screen display.

<Step S806>

The transmission unit 106 determines whether the user has input to the display unit 102 an instruction for completion and transmission of the setting change. As a result of the determination, if input is performed, the processing proceeds to step S807, and if input is not performed, processing waits in step S806.

<Step S807>

The transmission unit 106 generates a control signal indicating content for the setting change in step S805, and then transmits the control signal to the projection device specified in step S804. In other words, the transmission unit 106 outputs, to the projection device specified by the operation target specifying unit 105, the control signal in accordance with the user operation after the specification, to then perform control of setting of the projection device.

<Step S808>

The operation input unit 103 determines whether the user has performed an operation input for cancelling display of the above-described menu screen. For example, if currently, to adjust the image 400a, a value has just been set through the menu screen for the projection device 200 that projects the image 400a, and next, to adjust another image (for example, the image 400b), when setting through the menu screen is desired for a value for the projection device 201 that projects the image 400b, it is necessary to cancel display of the menu screen currently being displayed.

When the operation input unit 103 detects an operation input from a user for cancelling display of the above-described menu screen, the processing proceeds to step S800, and if input is not detected, the processing proceeds to step S809.

<Step S809>

The operation input unit 103 determines whether the user has performed an operation input for processing completion via the above-described menu screen. For example, it is determined whether a "close" button displayed on the menu screen has been touched. As a result of the determination, if the user has performed, via the above-described menu screen, an operation input for a completion of processing, the processing according to the flowchart of FIG. 3 ends, and if the operation input is not performed, the processing proceeds to step S806.

In this way, according to the present embodiment, by instructing a desired projected image from the captured image for the images projected by the respective projection devices that comprise in the multi-screen display, it is possible to instruct the projection device that projects the instructed projected image as a setting change target. Thereby, it is possible to conveniently perform the adjustment without impeding the view. Note that according to this embodiment, the number of projection devices is four, but this may be another number.

Second Embodiment

According to this embodiment, an approach to specifying a projection device that corresponds to a position instructed by a user on the display screen of the display unit 102 differs from the first embodiment. Hereinafter, explanation is given predominantly of differences from the first embodiment, and explanation is such that to the extent that something is not particularly touched upon below, it is similar to as in the first embodiment.

According to this embodiment, a terminal device 500 is used instead of the terminal device 100. The block diagram of FIG. 5 is used to given an explanation regarding an example of a functional configuration of the terminal device 500. In FIG. 5, a functional unit that is the same as a functional unit shown in FIG. 2 is given the same reference numeral, and explanation for the functional unit is omitted.

An image data acquiring unit 504 acquires, via the LAN 300 and from each of the projection devices 200-203, an "original image for the projected image" used to project the projected image, and an identifier for the corresponding projection device. When configuring the multi-screen display, to adjust distortion for an image projected on a flat surface for each of the projection devices 200-203, modification, called a keystone correction, of the geometric shape of the image is often performed. Here, to perform comparison with the projected image (an image for which there is none of the above-described distortion) displayed on the display screen of the display unit 102, the image before keystone correction, i.e. the original image, is acquired instead of the image for which keystone correction has been performed. Note that according to this embodiment, explanation is given focusing on an example of a case of acquiring the original image (projected image), but configuration may be taken to acquire an image reduced in accordance with the size or the like of the display screen of the terminal device 100 as the original image. In addition, there is no necessity to match the frame rate of projected images with the frame rate of images acquired by the terminal device 100. The same applies to original images in other embodiments.

An operation target specifying unit 505 extracts an image in a region (in a predetermined area) in the vicinity of a user indication position, detected by the operation input unit 103, on the display screen for the display unit 102 as a comparison image, and specifies an original image that includes a portion similar to the comparison image, from the original images acquired by the image data acquiring unit 504. For example, for each original image, pattern matching is performed with the comparison image while shifting the comparison image in the original image in a raster scan order, and an original image having an image region with the highest level of similarity with the comparison image is specified.

Note that because the scale is different between the original image and the images 400a-400d displayed on the display screen of the display unit 102, as a matter of course, this is the same for the original image and the comparison image. However, when performing image comparison such as pattern matching, it is necessary to perform the image comparison while considering each respective scale and appropriately resizing.

By sequentially searching the projected image for each of the projection devices 200-203 in the captured image in which the overall multi-screen display is captured, a projected image of each of the projection devices 200-203 on the captured image may be specified, and the projected image that includes the comparison image may be thereby specified. Note that in the present embodiment explanation is given focusing on an example in which the image capturing unit 101 captures all of the image 400, but the image capturing unit 101 need not necessarily capture all of the image corresponding to the multi-screen display (the image 400), and it possible to capture a portion of a region thereof. For example, from the image 400 corresponding to the multi-screen display, a user can capture a partial region whose settings are of particular interest. In this way, when performing the multi-screen display on a particularly large screen, the need for a user to move so as to capture all of the image 400 from the angle of view of the image capturing unit 101 decreases.

The operation target specifying unit 505 then specifies the projection device corresponding to the identifier acquired by the image data acquiring unit 504 along with the specified original image as a setting change target projection device. Other details are the same as the first embodiment.

Next, explanation is given regarding processing the terminal device 500 performs, by using FIG. 6, which shows a flowchart for the processing. Additionally, explanation is given for operation of the terminal device 500 in a state in which the image 400 is formed on a flat surface by the projection devices 200-203 respectively projecting the images 400a-400d on the flat surface, when the user holds the terminal device 500 in their hand with the image capturing unit 101 facing the image 400. Note that a processing step shown in FIG. 6 that is the same processing step as a processing step shown in FIG. 3 is given the same step number, and explanation for the processing step is omitted.

<Step S900>

The image data acquiring unit 504 acquires, via the LAN 300 and from each of the projection devices 200-203, an "original image for the projected image" used to project the projected image, and the identifier for the corresponding projection device. As described above, the original image may be the projected image converted into a lowresolution image. The frame rate for original images acquired by the image data acquiring unit 504 may be lower than a frame rate for images projected by the projection devices 200-203.

<Step S901>

The operation target specifying unit 505 extracts an image in a region in a vicinity of a user indication position detected by the operation input unit 103 on the display screen of the display unit 102 as a comparison image, and specifies an original image that includes a portion similar to the comparison image, from original images acquired by the image data acquiring unit 504.

<Step S902>

The operation target specifying unit 505 then specifies the projection device corresponding to the identifier acquired by the image data acquiring unit 504 along with the original image specified in step S901 as a setting change target projection device. In other words, the operation target specifying unit 505 specifies the projection device that is the setting change target based on a comparison between an image in a predetermined area from the position on the display screen at which the user operation on the display screen displayed by the captured image corresponding to the multi-screen display was performed, and the image projected from the projection device.

Here, using FIGS. 7A, 7B, 8A and 8B, explanation is given regarding an instruction operation performed by a user for the image projected on the display screen of the display unit 102, and a menu screen displayed in accordance with the instruction operation on the display screen of the display unit 102. This can be applied to both the first embodiment or the second embodiment.

As shown on FIG. 7A, if a user has indicated two projected images on the display screen of the display unit 102, as shown in FIG. 7B, a menu screen 121 corresponding to a projection device that projects one projected image, and a menu screen 122 corresponding to a projection device that projects the other projected image, are displayed on the display screen of the display unit 102. In other words, the operation target specifying unit 105 specifies two or more setting change target projection devices in accordance with the user operation. For example, after the user designates a first position on the display screen, if the user designates a second position within a predetermined amount of time, a first projection device corresponding to the first position and a second projection device corresponding to the second position are specified. The same applied to other embodiments. Note that the arrangement positions for each of the menu screens 121 and 122, as shown in FIGS. 7A and 7B, for example, may be displayed through the same positional relationship as the positional relationship between the indicated two points. In other words, the menu screen 121 is arranged as the menu screen for the projection device projecting the projected image indicated with an indication position on a top-right side, and the menu screen 122 is arranged as the menu screen for the projection device projecting the projected image indicated with an indication position on a bottom-left side. Thereby, the user can intuitively understand the correspondence between the projected image corresponding to the projection device for which adjustment is desired, and the menu for operating the same.

For example, as shown in FIG. 8A, if a user has indicated a region 130 (the region shown with diagonal lines) on the display screen of the display unit 102 in which a plurality of projected images overlap, as shown in FIG. 8B, a menu screen 140 corresponding to a projection device projecting one projected image from among the overlapping projected images, and a menu screen 141 corresponding to a projection device projecting the other projected image are displayed on the display screen of the display unit 102. Note that regarding the region in which projected images overlap each other, it is possible to obtain regions in which regions respectively overlap from information defining region a to region d in the screen configuration information. Note that the menu screen for each projection device may be the same menu screen, or a dedicated menu screen may be displayed for each projection device.

Note that methods for a user to perform an operation to indicate the projected image or for presenting the menu screen are not limited to those explained above. For example, if the region 130 is indicated, configuration may be made to display one menu screen common to the projection devices corresponding to each projected image overlapping in the region 130, and transmit details adjusted by the menu screen to the projection devices corresponding to each projected image overlapping in the region 130.

Third Embodiment

This embodiment differs from the second embodiment in a point of not displaying a captured image for the image that the projection devices 200-203 project on the display unit 102, but instead displaying the above-described original images acquired from each of the projection devices 200-203 on the display unit 102. Hereinafter, explanation is given predominantly of differences from the second embodiment, and explanation is such that to the extent that something is not particularly touched upon below, it is similar to as in the second embodiment.

According to this embodiment, a terminal device 600 is used instead of the terminal device 500. The block diagram of FIG. 9 is used to given an explanation regarding an example of a functional configuration of the terminal device 600. In FIG. 9, a functional unit that is the same as a functional unit shown in FIG. 5 is given the same reference numeral, and explanation for the functional unit is omitted.

Similarly to the image data acquiring unit 504, an image data acquiring unit 604 acquires, via the LAN 300, an "original image for the projected image" used to project the projected image from each of the projection devices 200-203, and an identifier for that projection devices. The image data acquiring unit 604 then sends each of the acquired original images to the display unit 102, and each of the original images are arranged and displayed on the display unit 102. Note that, similarly to the second embodiment, the original images may have the same number of pixels as the projected images, but may be images for which the projected images are reduced in accordance with the size or the like of the display screen of the terminal device 100. In addition, there is no necessity to match the frame rate of the projected images with the frame rate of the images acquired by the terminal device 100.

Setting may be performed in advance to display an original image acquired from a projection device in a display region associated in advance with an identifier for the projection device. For example, the display region corresponding to the identifier for the projection device 200 is the top-left, the display region corresponding to the identifier for the projection device 201 is the top-right, the display region corresponding to the identifier for the projection device 202 is the bottom-left, the display region corresponding to the identifier for the projection device 203 is the bottom-right, and in this fashion, in according to the arrangement order of the projected images for the projection devices 200-203 on the flat surface, the display regions for the original images from the projection devices 200-203 are determined. FIG. 11 is a view showing an example of displaying for original images.

The image data acquiring unit 604 outputs the original image acquired from the projection device 200 to the display unit 102 so as to display it in a display region corresponding to the identifier for the projection device 200, outputs the original image acquired from the projection device 201 to the display unit 102 so as to display it in a display region corresponding to the identifier for the projection device 201, outputs the original image acquired from the projection device 202 to the display unit 102 so as to display it in a display region corresponding to the identifier for the projection device 202, and outputs the original image acquired from the projection device 203 to the display unit 102 so as to display it in a display region corresponding to the identifier for the projection device 203. Note that a configuration may be taken to not just display an original image on the display unit 102, but to display the original image together with the identifier for the projection device that is the acquisition source for the original image.

An operation target specifying unit 605 specifies which of each original image displayed on the display unit 102 has been indicated by a user. This may be performed by specifying whether a user indication position detected by the operation input unit 103 is a position in a display region from the display regions for each of the original images. The operation target specifying unit 605 then specifies the projection device corresponding to the identifier associated with the display region that includes the user indication position as the setting change target projection device. Further details are the same as in the second embodiment.

Next, using a flowchart of FIG. 10, explanation is given regarding processing the terminal device 600 performs. Note that a processing step shown in FIG. 10 that is the same processing step as a processing step shown in FIG. 6 is given the same step number, and explanation for the processing step is omitted.

<Step S900>

The image data acquiring unit 604 acquires, via the LAN 300 and from each of the projection devices 200-203, an "original image for the projected image" used to project the projected image, and an identifier for the corresponding projection device.

<Step S1000>

The image data acquiring unit 604 then sends each of the original images acquired in step S900 to the display unit 102, and each of the original images are arranged and displayed on the display unit 102.

<Step S1000a>

The operation target specifying unit 605 determines whether an instruction has been made on a display region for each original image. As a result of the determination, if instructed, the processing proceeds to step S1001; if not instructed, processing waits in step S1000a.

<Step S1001>

In step S1001, the operation target specifying unit 605 specifies which of each original image (projected image) displayed on the display unit 102 has been instructed by a user. The operation target specifying unit 605 then specifies the projection device corresponding to the specified original image (display region) as a setting change target projection device. In other words, the operation target specifying unit 605 specifies the setting change target projection device based on a comparison between an image in a predetermined area from a position of a user operation in the display screen corresponding to a display screen in which the projected image is displayed, and the projected image acquired from each projection device.

Fourth Embodiment

This embodiment differs from the first embodiment in a point of the display unit 102 not displaying the captured image but instead displaying frames representing regions for each of the images 400a-400d in the image 400. Hereinafter, explanation is given predominantly of differences from the first embodiment, and explanation is such that to the extent that something is not particularly touched upon below, it is similar to as in the first embodiment.

According to this embodiment, a terminal device 700 is used instead of the terminal device 100. The block diagram of FIG. 12 is used to given an explanation regarding an example of a functional configuration of the terminal device 700. In FIG. 12, a functional unit that is the same as a functional unit shown in FIG. 2 is given the same reference numeral, and explanation for the functional unit is omitted.

It is possible to obtain a positional relationship for each of the images 400a-400d in the image 400 from region a to region d, which represent screen configuration information (configuration information) that the screen configuration acquisition unit 104 acquires. An operation target specifying unit 705 refers to the screen configuration information, and, in accordance with a positional relationship for each of the images 400a-400d, displays on the display unit 102 a frame corresponding to each of the images 400a-400d. For example, as shown on FIG. 14, a frame corresponding to the image 400a is displayed on the top-left of the display screen in the display unit 102, a frame corresponding to the image 400b is displayed on the top-right of the display screen in the display unit 102, a frame corresponding to the image 400c is displayed on the bottom-left of the display screen in the display unit 102, and a frame corresponding to the image 400d is displayed on the bottom-right of the display screen in the display unit 102. Note that frames with solid lines are displayed in FIG. 14, but there is no limitation to solid-line frames if it is possible to distinguishably display a projection area for each of the plurality of projection devices. For example, a configuration may be taken to use a dotted-line frame or a dashed-dotted line frame, and it is also possible to distinguishably display using color in place of a frame.

The operation target specifying unit 705 specifies which of the frames displayed on the display unit 102 has been instructed by a user. This may be performed by specifying whether a user indication position detected by the operation input unit 103 is a position in one of the frames. The operation target specifying unit 705 then specifies the projection device corresponding to the specified frame (specify a projection device defined by the screen configuration information as the projection device that projects the image corresponding to the specified frame) as the setting change target projection device. Further details are the same as in the first embodiment.

Next, using a flowchart of FIG. 13, explanation is given regarding processing the terminal device 700 performs. Note that a processing step shown in FIG. 13 that is the same processing step as a processing step shown in FIG. 3 is given the same step number, and explanation for the processing step is omitted.

<Step S1300>

The operation target specifying unit 705 refers to the screen configuration information, and, in accordance with a positional relationship for each of the images 400a-400d, displays on the display unit 102 a frame corresponding to each of the images 400a-400d.

<Step S1301>

The operation input unit 103 determines whether an instruction has been made for a position in one of the frames displayed on the display unit 102. As a result of the determination, if an instruction has been made, the processing proceeds to step S1302; if not instructed, processing waits in step S1301.

<Step S1302>

The operation target specifying unit 705 specifies which of the frames displayed on the display unit 102 has been instructed by a user. The operation target specifying unit 705 then specifies the projection device corresponding to the specified frame as a setting change target projection device. In other words, the operation target specifying unit 705 specifies the setting change target projection device in accordance with a position on the display screen of the user operation which corresponds to the display screen on which projection areas for a plurality of projection devices are distinguishably displayed based on the configuration information.

Note that all or a portion of the embodiments described above may be used as appropriate in combination.

Fifth Embodiment

Of each functional unit shown on FIGS. 2, 5, 9, and 12, each functional unit excluding the image capturing unit 101, the display unit 102, the operation input unit 103, and the transmission unit 106 may be configured as hardware, or may be configured as software (a computer program). In such a case, a computer program is stored in memory held by the terminal device, and processing for a corresponding functional unit is realized by a processor such as a CPU executing the computer program. A hardware configuration example of the terminal device in such a case is explained using the block diagram of FIG. 15. In FIG. 15, a functional unit that is the same as a functional unit shown in FIG. 2 is given the same reference numeral, and explanation for the functional unit is omitted.

A CPU 1501 uses a computer program, data, or the like, stored in a RAM 1502 or a ROM 1503 to execute processing, to thereby perform overall operation control for the terminal device and to execute each above-described process as something that the terminal device performs.

The RAM 1502 has an area for storing a computer program or data loaded from the ROM 1503, or an area for storing, for example, data acquired from the image capturing unit 101 or an external unit (for example, the projection devices 200-203). The RAM 1502 also has a work area used when the CPU 1501 executes various processing. In this way, the RAM 1502 is able to appropriately provide various areas.

The ROM 1503 stores setting data, a boot program, or the like for the terminal device. Furthermore, the ROM 1503 stores a computer program or data to cause the CPU 1501 to execute the above-described processing performed by each functional unit shown in FIGS. 2, 5, 9, and 12, except for the image capturing unit 101, the display unit 102, the operation input unit 103, and the transmission unit 106. Computer programs or the data stored in the ROM 1503 is appropriately loaded into the RAM 1502 in accordance with control by the CPU 1501, and is the target of processing by the CPU 1501.

A touch panel screen 1504 is configured by the display unit 102 and the operation input unit 103, and as described above, displays various information, and also detects an input of an instruction from a user.

The CPU 1501, the RAM 1502, the ROM 1503, the image capturing unit 101, the touch panel screen 1504, and the transmission unit 106 are each connected to a common bus 1505. Note that hardware configurations applicable to the terminal device are not limited to the configuration shown in FIG. 15, and various configurations may be considered.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-184542, filed Sep. 10, 2014 which is hereby incorporated by reference herein in its entirety.

The invention claimed is:

1. A communication apparatus having a display screen, the apparatus comprising:
    a configuration acquirer that acquires configuration information indicating a positional relationship for projected images of a plurality of projectors in a multi-projection realized by the plurality of projectors;
    an input acceptor that accepts an instruction inputted via the display screen, which displays an image according to the positional relationship;
    a specifier that specifies a projector for which a setting is to be changed, from the plurality of projectors, based on a position on the display screen at which the instruction was accepted by the input acceptor, and based on the configuration information acquired by the configuration acquirer; and
    a transmitter that transmits a signal for changing the setting of the projector specified by the specifier.

2. The communication apparatus according to claim 1, wherein the signal for changing the setting is a signal for changing at least one of a luminance setting, a color setting, or a projection shape setting of the projector specified by the specifier.

3. The communication apparatus according to claim 1, further comprising a camera that captures an image, wherein
    the display screen displays the image captured by the camera, and
    the specifier specifies, from the display screen, a multi-projection region for which the multi-projection is being executed, and, based on the specified multi-projection region and the configuration information, specifies a projector, as the projector for which the setting is to be changed, that projects an image corresponding to the position at which the instruction was accepted by the input acceptor.

4. The communication apparatus according to claim 1, wherein
    the display screen displays lines based on the configuration information, and the specifier specifies the projector for which the setting is to be changed based on the position of the instruction inputted via the display screen on which the lines are displayed.

5. The communication apparatus according to claim 4, wherein the lines indicate a projection area for each of the plurality of projectors.

6. The communication apparatus according to claim 1, further comprising an image acquirer that acquires an image corresponding to the images projected by the plurality of projectors,
wherein the specifier specifies the projector for which the setting is to be changed, based on an image corresponding to a predetermined range on the display screen from the position of the instruction inputted on the display screen, and the image acquired by the image acquirer.

7. The communication apparatus according to claim 6, further comprising a camera that captures an image, wherein
the display screen displays the image captured by the camera, and
the specifier specifies the projector for which the setting is to be changed, based on an image corresponding to the predetermined range on the display screen from the position of the instruction inputted on the display screen displaying the image captured by the camera, and the image acquired from at least one of the plurality of projectors by the image acquirer.

8. The communication apparatus according to claim 1, further comprising an image acquirer that acquires an image corresponding to the images projected by the plurality of projectors, wherein
the display screen displays the image acquired from the plurality of projectors by the image acquirer, and
the specifier specifies the projector for which the setting is to be changed, based on an image corresponding to a predetermined range on the display screen from the position of the instruction inputted on the display screen, and the image acquired by the image acquirer.

9. The communication apparatus according to claim 8, wherein the specifier specifies an image similar to the image corresponding to the predetermined range on the display screen from the position of the instruction from the image acquired by the image acquirer, and specifies a projector that projects the specified image as the projector for which the setting is to be changed.

10. The communication apparatus according to claim 1, wherein the configuration information is information that associates identification information of a projection region in the multi-projection region in which the multi-projection is performed, and identification information of a projector corresponding to the projection region.

11. The communication apparatus according to claim 1, wherein
the input acceptor accepts a setting change completion instruction that indicates completion of a setting change for the projector specified by the specifier, and
the transmitter transmits the signal for changing the setting of the projector specified by the specifier in accordance with acceptance of the setting change completion instruction by the input acceptor.

12. The communication apparatus according to claim 1, wherein, when the input acceptor has accepted a plurality of instructions, the specifier specifies a plurality of projectors in accordance with the configuration information and a position on the display screen for each of the plurality of instructions, as a plurality of projectors for which the setting is to be changed.

13. The communication apparatus according to claim 1, wherein, when the position on the display screen of the instruction accepted by the input acceptor corresponds to a projection area for a plurality of projectors, the specifier specifies the plurality of projectors as projectors for which the setting is to be changed.

14. A method of controlling a communication apparatus that includes a display screen, the method comprising:
acquiring configuration information indicating a positional relationship for projected images of a plurality of projectors in a multi-projection realized by the plurality of projectors;
accepting an instruction inputted via the display screen, which displays an image according to the positional relationship;
specifying a projector for which a setting is to be changed, from the plurality of projectors, based on a position on the display screen at which the instruction was accepted, and the acquired configuration information; and
transmitting a signal for changing the setting of the specified projector.

15. The method according to claim 14, wherein the signal for changing the setting is a signal for changing at least one of a luminance setting, a color setting, or a projection shape setting for the specified projector.

16. The method according to claim 14, further comprising:
capturing an image, wherein the display screen displays the captured image;
specifying, from the display screen, a multi-projection region for which the multi-projection is being executed; and
specifying a projector, as the projector for which the setting is to be changed, that projects an image corresponding to the position at which the instruction was accepted based on the specified multi-projection region and the configuration information.

17. A non-transitory computer-readable storage medium storing a computer program for causing a computer to function as:
a configuration acquirer that acquires configuration information indicating a positional relationship for projected images of a plurality of projectors in a multi-projection realized by the plurality of projectors;
an input acceptor that accepts an instruction inputted via a display screen, which displays an image according to the positional relationship;
a specifier that specifies a projector for which a setting is to be changed, from the plurality of projectors, based on a position on the display screen at which the instruction was accepted by the input acceptor , and based on the configuration information acquired by the configuration acquirer; and
a transmitter that transmits a signal for changing the setting of the projector specified by the specifier.

18. The non-transitory computer-readable storage medium according to claim 17, wherein the signal for changing the setting is a signal for changing at least one of a luminance setting, a color setting, or a projection shape setting for the projector specified by the specifier.

19. The non-transitory computer-readable storage medium according to claim 17, further comprising a camera that captures an image, wherein
the display screen displays the image captured by the camera, and the specifier specifies, from the display screen, a multi-projection region for which the multi-projection is being executed, and, based on the specified multi-projection region and the configuration information, specifies a projector, as the projector for which the setting is to be changed, that projects an image corresponding to the position at which the instruction was accepted by the input acceptor.

* * * * *